United States Patent
Vetrovec et al.

(10) Patent No.: US 7,413,787 B2
(45) Date of Patent: Aug. 19, 2008

(54) ADHESIVE SHEET

(75) Inventors: Jan Vetrovec, Thousand Oaks, CA (US); Katerina Vetrovec, Thousand Oaks, CA (US)

(73) Assignee: Agwest, LLC, Larkspur, CO (US)

( * ) Notice: Subject to any disclaimer, the term of this patent is extended or adjusted under 35 U.S.C. 154(b) by 0 days.

(21) Appl. No.: 10/969,114

(22) Filed: Oct. 20, 2004

(65) Prior Publication Data

US 2006/0083894 A1   Apr. 20, 2006

(51) Int. Cl.
*B32B 7/00* (2006.01)
*B32B 3/10* (2006.01)
*B32B 7/02* (2006.01)
*B32B 27/32* (2006.01)
*B32D 65/28* (2006.01)
*B41M 5/00* (2006.01)

(52) U.S. Cl. .................. 428/40.1; 428/42.1; 428/43; 428/131; 428/137; 428/138; 428/195; 428/213; 428/220

(58) Field of Classification Search ............... 428/40.1, 428/42.1, 43, 131, 137, 138, 213, 195, 220
See application file for complete search history.

(56) References Cited

U.S. PATENT DOCUMENTS

| | | |
|---|---|---|
| 4,548,846 A | 10/1985 | Kurtz |
| 5,613,942 A | 3/1997 | Lucast |
| 5,914,282 A | 6/1999 | Dunshee |
| 6,015,606 A | 1/2000 | Abe |
| 6,228,485 B1 * | 5/2001 | Leiter .................. 428/343 |
| 6,294,250 B1 | 9/2001 | Date |
| 6,599,967 B2 | 7/2003 | Kishioka et al. |

* cited by examiner

*Primary Examiner*—Victor S Chang

(57) ABSTRACT

An adhesive sheet is disclosed including a flexible substrate and an adhesive layer formed on at least one of the main surfaces of the flexible substrate. The adhesive sheet further includes a plurality of microscopic holes connecting the opposing surfaces of the sheet and being generally perpendicular to them. Such adhesive sheet is permeable by air and allows good bubble escapability when the sheet is applied to an article. Sufficient permeability of the sheet to air is achieved with microscopic size holes installed in modest areal densities, hence the appearance and functionality of the film surface are not significantly adversely impacted. One intended use of the subject invention is for tinting films used to reduce light transmission in windows for use in buildings and automobiles. In this application visual appearance of the film is paramount. Another intended application of the subject invention is for antireflective film which is applied to electronic computer displays (flat panel, cathode ray tube) to reduce unwanted ambient light reflection and to improve contrast.

24 Claims, 3 Drawing Sheets

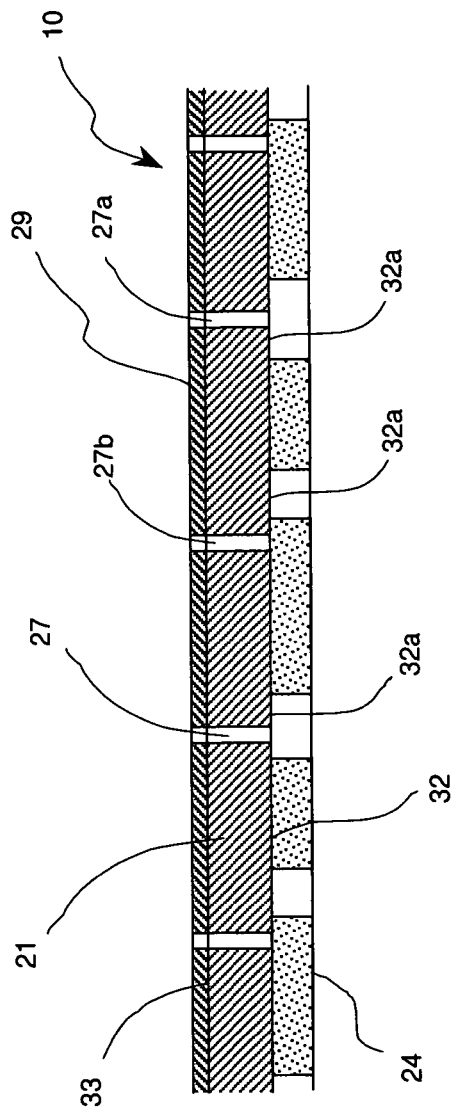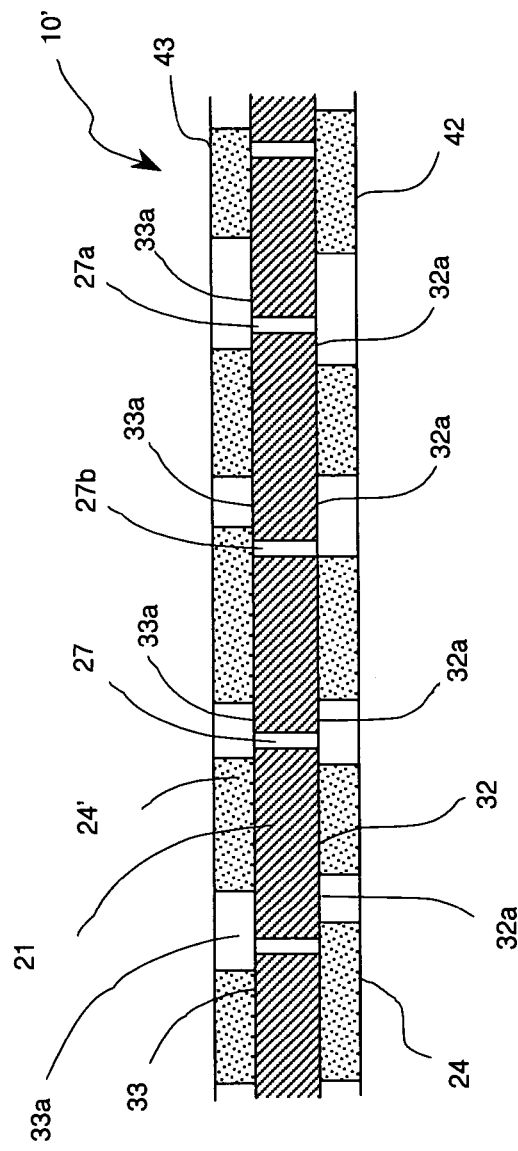

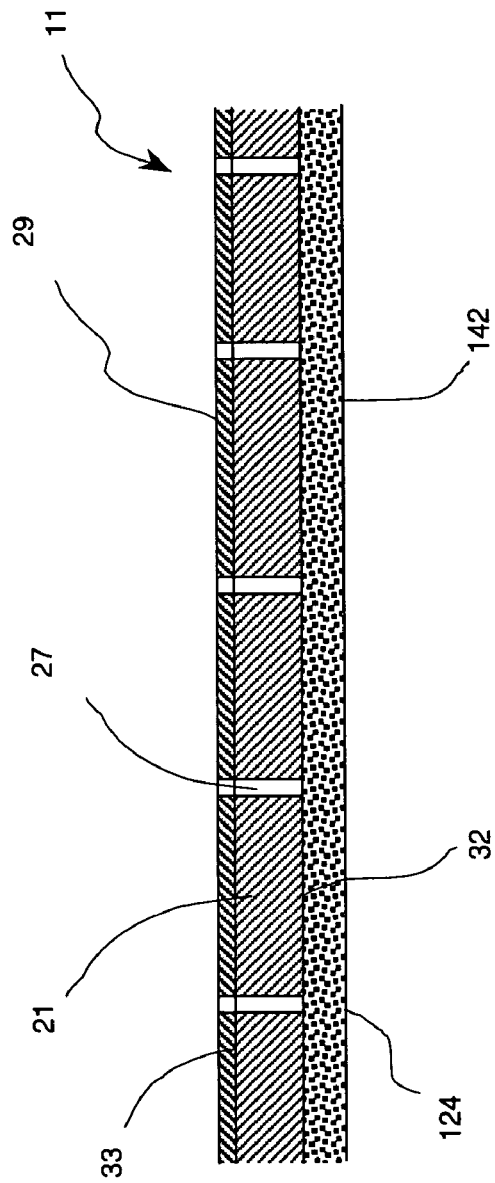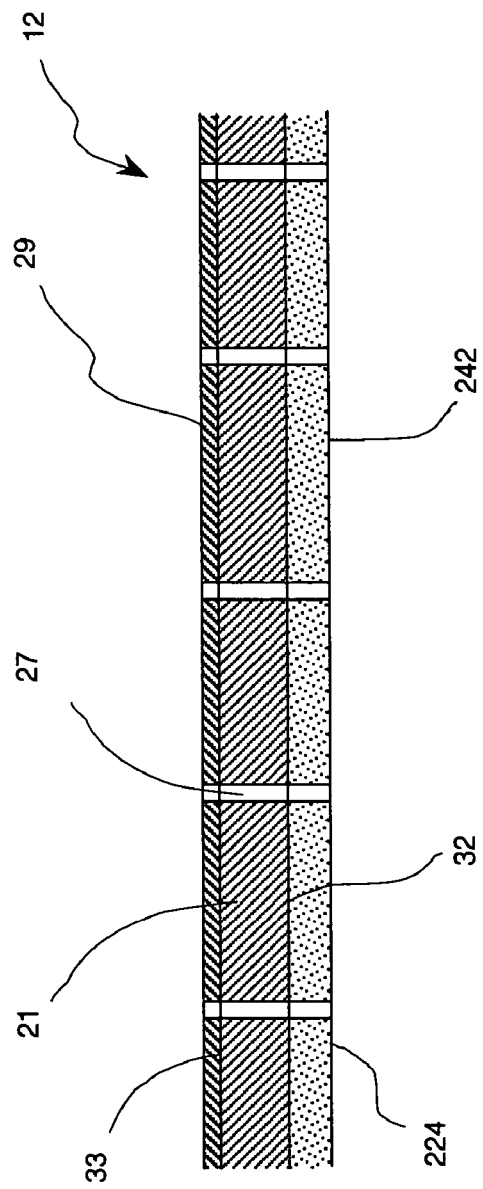

ADHESIVE SHEET

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The present invention relates to an adhesive film in a form of a sheet, strip, tape, label, tag, and the like which is perforated with microscopic holes to provide good air bubble escapability while maintaining good appearance and functionality of the film surface after being adhered to an article.

BACKGROUND OF THE INVENTION

Various types of adhesive films comprising a flexible substrate and an adhesive layer have been heretofore available. Such films are provided in the form of sheets, tapes, strips, labels, tags, and the like. Those films having a pressure sensitive adhesive layer generally are mounted on some type of release liner or other releasable support to protect the pressure sensitive adhesive until the film is ready to be applied to an intended article. The film is then stripped from the release liner and applied.

Typically, the substrate for such a film is a self-supporting web or a sheet of paper, cardboard, plastic, or metal. One major face of the substrate has a pressure sensitive adhesive while the other major face can be further coated and/or printed on. Such coating and/or printing can be accomplished either before or after the application of adhesive to the first major face. Other versions of adhesive film have adhesive coating on both faces of the substrate and are known as "double sided" or "two-sided.". Adhesive films of this basic construction are manufactured for a variety of commercial and consumer uses including labels, tags, and stickers for industrial and consumer products, decorative films for furniture finish and wall covering, tinting films for building and automotive windows, and antiglare films for computer displays. Such films constructed in accordance with prior art are substantially impervious to air and liquids. This condition is due to a variety of practical considerations including the choice of materials and manufacturing processes used, and requirements for appearance and function.

Problem: When an adhesive film according to the prior art is applied to an article, air tends to become entrapped between the adhesive and the article surface. This condition is shown in FIG. 1. To prevent such entrapment and the resulting bubble, a considerably high level of skill is necessary during the application step. Consequently, a great amount of labor and time are necessary to perform the bonding application step. Tolerance for errors during the bonding step is very low because the bond strength rises with the passage of time, which makes it more difficult to peel the adhesive sheet from the substrate article and reposition it at later time. When air bubbles are trapped between the adhesive layer and adherent article surface, the appearance of the film is negatively impacted. This condition is highly undesirable especially when the film is used for decorative purposes.

Even when the film is applied to the article surface and trapped air bubbles are avoided, lifting and formation of bubbles can occur at the bond interface when the film is exposed to environment such as heat and light. Exposure to ultraviolet light is considered especially deleterious. This is particularly detrimental to the appearance and functionality of transparent films such as employed for tinting of windows used in buildings and automobiles, and antiglare films used for electronic and computer displays (flat panel, cathode ray tube).

REVIEW OF PRIOR ART

Prior art discloses several approaches to the design of adhesive films that avoid the trapping of air when adhesive film is applied to article. These prior art approaches can be grouped as follows: 1) use of permeable film substrate, 2) use of permeable adhesive structure, and 3) use of permeable surface structure of the adherent article.

1) Use of permeable substrate: Substrate materials for construction of adhesive films having physical characteristics which allow for significant air permeability are well known and are generally referred to as being porous. Porous substrate materials typically have woven, non-woven, knitted, or foamed constructions, or are formed as microporous sheets. Adhesive films with porous substrate have many applications and are particularly useful as tapes in the medical field. See for example, Lucast et al., in U.S. Pat. No. 5,613,942 and Dunshee et al., in U.S. Pat. No. 5,914,282. When porous substrate is used in construction of adhesive film, one should generally avoid using adhesives which readily migrate into the interstices of the porous substrate, thus filling the pores. Another limitation of films with porous substrate is that when a coating or an ink for decoration is applied to the second, non-adhesive face of the substrate, it tends to close the pores of the porous substrate and initial performance cannot be obtained. This condition is particularly problematic when a coating with sealing properties is highly desirable as the means for protecting the non-adhesive surface of the adhesive film from dust, dirt, moisture, liquids, or human touch, or when such a coating is used to improve the performance, prepare the surface for printing, or protect the print ink. Furthermore, many desirable substrate materials including plastics and metals are not naturally porous and permeable by air. Hence, the usefulness of permeable substrate of prior art for construction of adhesive films is very restricted.

2) Use of permeable adhesive structure: Abe in U.S. Pat. No. 6,015,606 discloses adhesive film having structured adhesive including raised portions. Such raised portions are generated by elastic microspheres included in the adhesive. During the application step, the raised portions on the adhesive layer allow formation of passages which communicate with the atmosphere and through which bubbles trapped between the adherent article and the adhesive layer escape to the atmosphere. This situation is shown in FIG. 2a. However, as the film is pressed onto the article, the raised portions are gradually flattened thereby closing off the passages. Hence, initial performance is degraded. This situation is shown in FIG. 2b. Therefore, a precise sequencing is required to assure that all of the trapped air is expelled before the passages are closed off. Such sequencing is, however, difficult to achieve in practice. Furthermore, formation of structured adhesive layer requires special equipment. In addition, once the film is applied to an article, gasses generated at the bond interface when exposed to environment such as heat and light cannot escape and, as a result, cause bubbles and lifting. A more complex adhesive structure disclosed by Abe in U.S. Pat. No. 6,294,250 has the same limitations.

3) Use of permeable adherent surface structure: Kurtz in the U.S. Pat. No. 4,548,846 discloses an adherent article with a specially prepared grooved surface. When adhesive film is applied to such grooved surface, the grooves provide channels for communication with outside atmosphere and allow trapped air to escape. This condition is shown in FIG. 3. However, this approach is not suitable for general use as it requires special preparation of adherent article surface. Such surface preparation is costly and impractical in most situations, especially when the adherent article is a glass window or computer display. In addition, the need for surface preparation greatly restricts the choice of adherent materials and limits the selection of sites on the surface of substrate article that are suitable for receiving adhesive film.

Permeability of materials by air can be quantified in terms of Gurley value. Gurley value (also known as Gurley seconds) for porosity is measured on a Gurley porosity tester (Gurley Precision Instruments, Troy, N.Y.) and it represents the time (in seconds) for 100 cubic centimeters (about 6.1 cubic inches) of air to flow through 1 square inch area of test material under pressure gradient of 1.2 kilo-Pascals (about 4.9 inches of water). The Gurley value actually represents air resistance, but popularly is referred to as permeability or porosity. A low Gurley value indicates high porosity material, while a high Gurley value indicates a low porosity material. For comparison purpose, 50 pound smooth paper for offset printing has a Gurley value around 20.

SUMMARY OF THE INVENTION

To overcome the limitations of prior art, the present inventors made an extensive study, and as a result, they have discovered a novel construction and a method for manufacture for adhesive film having good air bubble escapability. The invention is based on experimental evidence indicating that very modest air permeability of the film is sufficient to prevent trapping pockets of air between the film and an adherent article when the film is applied to the article surface. The inventors have determined that appropriate air permeability can be achieved by perforating the film with microscopic holes at relatively low areal density. Using this approach, the film is rendered permeable without significantly affecting its appearance or functionality.

The present invention is an adhesive film which is permeable by air. The film comprises a thin flexible substrate such as a sheet, strip, tape, tag, or the like, coated with a layer of adhesive on at least one side. Substrate materials suitable for use with the subject invention include paper, cardboard, plastics, and metal. The substrate may also include a print and/or protective coating on its other surface opposite to the surface coated with adhesive layer. The substrate is perforated by a number of microscopic holes generally perpendicular to its surfaces. Such holes are generally 1 to 300 micrometers in transverse dimension. Size and areal density of the microscopic holes are chosen to provide appropriate permeability by air while avoiding degradation in appearance and functionality of the film. For example, if the subject invention is used as an antireflective film for computer screens such as disclosed by Kishioka et al., in the U.S. Pat. No. 6,599,967, the microscopic holes should be preferably less than about 10 micrometers in size and applied with areal density about 100 to about 1000 per square inch. When used for wall covering, the microscopic holes from about 30 to about 100 micrometers in size and areal density of about 1 to about 100 per square inch can be employed in many cases without adversely affecting the film appearance. For comparison, a typical human hair has a diameter around 70 micrometers. This is also considered the limit of optical resolution of human eye. Objects smaller than 10 micrometers are generally indistinguishable by naked human eye.

In one embodiment of the subject invention, the adhesive is applied over less then 100% of each substrate surface. In particular, adhesive may be applied in regular or irregular patterns that provide predetermined coverage (typically 20 to 90%) of the coated substrate face. The desired level of air permeability is obtained by installing microscopic holes in the substrate so that when averaged over the surface area, a sufficient number of these holes are in locations where the substrate surfaces are not covered by adhesive. The microscopic holes can be installed in the substrate prior to coating with adhesive or after the coating process. Suitable methods for production of microscopic holes include mechanical piercing, perforation by electric discharge (spark), and laser drilling. The microscopic holes can be applied in patterns that are coordinated with the adhesive coating patterns so as to preferentially perforate the substrate in areas not having adhesive coating. Alternately, the holes can be applied in regular, irregular, or even random patterns with sufficient areal density to assure that a sufficient quantity of the holes penetrates the substrate in areas not covered with adhesive coating. If the film substrate also has an ink print and/or decorative/protective coating on the face opposite to that of the adhesive, the holes are installed therethrough so that the desired permeability is achieved.

In another embodiment of the subject invention, the adhesive is applied over generally 100% area of at least one surface. In one variant of this embodiment, the adhesive has microscopic voids forming passages, with some of the passages connecting to the microscopic holes in the substrate. In another variant, the microscopic holes are generated after the adhesive has been applied to the film and penetrate through the adhesive layer with sufficient spatial frequency to achieve the desired level of air permeability.

In each embodiment of the subject invention, the microscopic holes provide a path for air to permeate through the adhesive film of the subject invention. When the film of the subject invention is applied to a substrate, pockets of air trapped between the film and the substrate surface are relieved to outside atmosphere. As a result, formation of bubbles of trapped air is avoided. When adhered film is exposed to environment such as light and heat that cause the materials in the vicinity of adhesive bond interface generate gas, such gas is readily relieved through the microscopic holes to the atmosphere.

In many instances, most notably in consumer articles, it is desirable to remove the product label after the product has been purchased. Yet, very often the adhesive employed (usually pressure sensitive or water soluble type) adheres very well to the article and the label substrate is too weak to carry the force required to peel off the label without breaking. Softening the adhesive with suitable solvent requires great amount of time since the solvent has to penetrate the adhesive layer starting from the edge. In contrast, when the product label is fabricated in accordance with the subject invention, the solvent can readily permeate through the film substrate via microscopic holes and soften the adhesive, thereby making it possible to remove the label shortly after the solvent it applied.

OBJECTS OF THE INVENTION

One object of the invention is to allow removal and venting of air entrapped between adhesive films and surface of adherent article when the film is applied to the article.

Another object of the invention is to allow venting of gases evolved at the bond interface after an adhesive film has been applied to an adherent article.

Yet another object of the invention is to allow for easier removal of adhesive film after it has been adhered to an adherent article.

Yet another object of the invention is to improve appearance of adhesive film adhered to an article.

Yet another object of the invention is to make easier installation of adhesive film onto an article.

Features and advantages of the invention will emerge in the discussion of the embodiments.

BRIEF DESCRIPTION OF THE DRAWINGS

FIG. 4 shows a side cross-sectional view of a first embodiment of the subject invention with adhesive layer applied discontinuously to one face of the substrate;

FIG. 5 shows a side cross-sectional view of a variant of a first embodiment of the invention with adhesive layer applied discontinuously to both faces of the substrate;

FIG. 6 shows a side cross-sectional view of a second embodiment of the subject on using porous adhesive;

FIG. 7 shows a side cross-sectional view of a third embodiment of the subject on with holes installed through the adhesive layer.

DRAWINGS—REFERENCE NUMERALS

Figure 2:
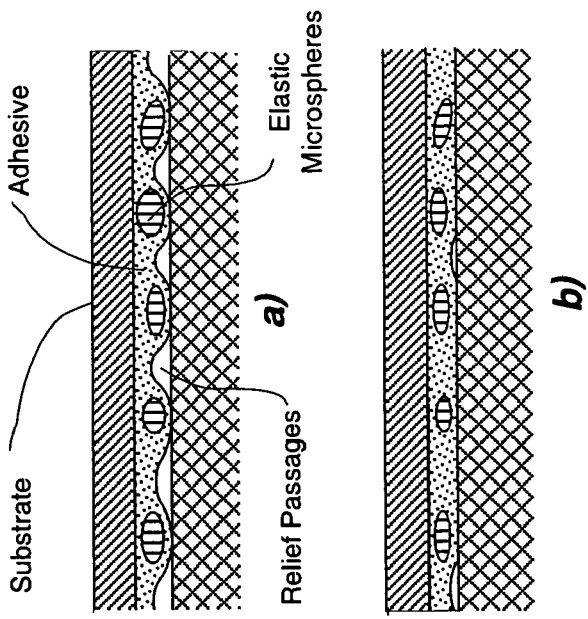
FIG. 2a shows a side cross-sectional view of a prior art adhesive film applied to an article wherein a permeable adhesive structure forming passages is used to relieve trapped air.
FIG. 2b shows an adhesive film of FIG. 2a wherein passages used to relieve trapped air have significantly collapsed.
Figure 3:
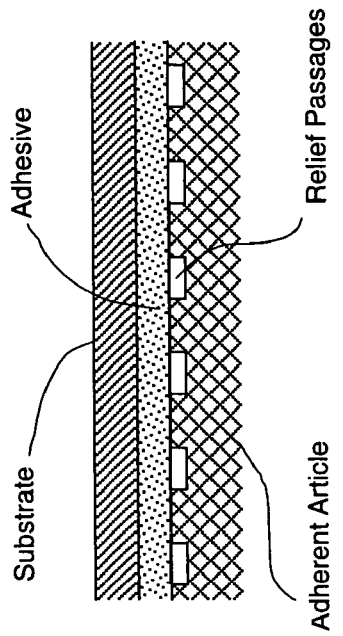
FIG. 3 shows a side cross-sectional view of a prior art adhesive film applied to an adherent surface having relieve passages.
Figure 1:
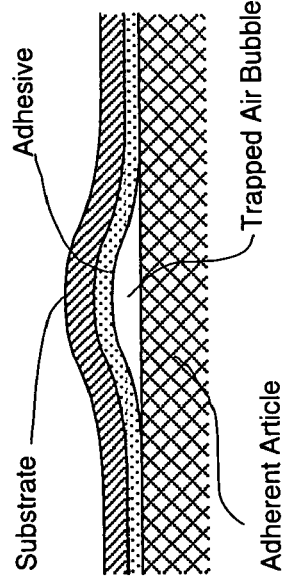
FIG. 1 shows a side cross-sectional view of a prior art adhesive film applied to an article wherein a bubble is formed by entrapped air.

10 Adhesive film—First embodiment
10' Adhesive film—Variant to a first embodiment
11 Adhesive film—Second embodiment
12 Adhesive film—Third embodiment
21 Substrate
24 Adhesive
27 Microscopic hole
29 Finish layer
32 Surface of substrate
33 Surface of substrate
42 Surface for attaching release liner
43 Surface of adhesive
124 Adhesive
224 Adhesive

DETAILED DESCRIPTION OF PREFERRED EMBODIMENTS

Referring now to FIG. 4, there is shown a side cross-sectional view of an adhesive film 10 in accordance with a first embodiment of subject invention. The film 10 comprises a flexible substrate 21 having surfaces 32 and 33. The substrate 21 is a thin flexible member that can be in a form of a sheet, strip, tape, label, or alike. Typical thickness of substrate 21 is 10 to 1500 micrometers. Suitable materials for fabrication of the substrate include paper, cardboard, plastics, and metals. More specifically, suitable plastics include polyethylene, polyvinyl chloride (PVC), polyester, polyurethane, polyacrylate, etc. PVC resin is particularly suitable for the construction of substrate 21 because it can be easily printed onto. In addition, PVC is economical and has good weatherability, which makes it suitable for outdoors use. Furthermore, in the present invention it is possible to use those film substrates to which surface treatment such as printing, embossing, and protective layers is applied. Surface 32 of substrate 21 is coated with a pressure sensitive adhesive 24, which is applied in a discontinuous manner so that portions 32a of the surface 32 are generally free of the adhesive material. Preferably, the adhesive 24 covers less than 90% of the surface 32. The pressure sensitive adhesive 24 may be applied in regular, irregular, or entirely random patterns. Examples of suitable patterns are straight lines, stripes, wavy lines, curves, dots, shapes, checkered, crosshatched, and any combination thereof. A variety of pressure sensitive adhesives can be used with the subject invention including the types that contain elastic microoospheres as for example disclosed by Date in U.S. Pat. No. 6,294,250.

The substrate 21 is further perforated by microscopic holes 27 which are installed generally perpendicular to the surface 32. The pattern for placement of the microscopic holes 27 can be coordinated with the pattern of the adhesive 24 to yield a high percentage of the microscopic holes placed in the portions 32a of surface 32. This percentage can be 100% if the adhesive pattern and hole pattern are well coordinated. Holes terminating in surface portion 32a which is not coated by adhesive are open and available for transport of air through the film 10. Hole 27a is an example of an open hole. Unless porous adhesive is used, microscopic holes terminating into the adhesive 24 are deemed substantially blocked by the adhesive and not significantly contributing to air transport through the film. Hole 27b is an example of a blocked hole. Alternate to coordinated patterns, the pattern for microscopic holes 27 can be uncoordinated with the patterns for adhesive 24, and can be regular, irregular, or random. Whichever the choice, the areal density and the size of microscopic holes should be chosen so that the permeability of the film 10 rendered by the unblocked holes is in the range of 1 to 1000 Gurley seconds when measured under the already described conditions. Appropriate size and areal density of microscopic holes 27 can be estimated using the theory of air flow through microscopic holes in thin sheets.

EXAMPLE 1

Table 1 shows theoretical predictions of air flow through smooth holes with diameters of 10, 32, and 100 micrometers installed in a 75 micrometer thick sheet impervious to air and operated with a pressure differential of 1.2 kilo Pascals (4.9 inches of water). (Note that this is the same pressure differential normally used in the Gurley tester.) This data is based on theoretical predictions found in "Effect of Pinholes on Sterile Barrier Properties," by Earl T. Hackett, Jr. presented at the HealthPak Conference, St. Petersburg, Fla., in March 2001.

TABLE 1

|  | Hole Diameter [micrometers] | | |
| --- | --- | --- | --- |
|  | 10 μm | 32 μm | 100 μm |
| Flow velocity [cm/sec] | 400 | 3500 | 5500 |
| Flowrate per hole [cubic cm/sec] | 0.000314 | 0.028 | 0.039 |
| Porosity produced by 1 hole per inch square [Gurley seconds] | 318000 | 3571 | 256 |
| Areal density of holes necessary to produce porosity of 100 Gurley seconds [per square inch] | 3,180 | 36 | 2.6 |

EXAMPLE 2

Table 2 shows several suitable choices of diameter and areal density for microscopic holes suitable to relieve 1 cubic centimeter air bubble to atmosphere in less 5 seconds assuming a constant pressure differential of 1.2 kilo Pascals. Sheet thickness is 75 micrometers. Expectedly, the data shows that smaller holes must be applied with greater areal density to meet the specified venting time during installation of adhesive film to an article. Note that even for a 10 micrometer diameter hole the required areal density of 1,000 to 10,000 holes per square inch is realistic and technically attainable.

TABLE 2

| Areal density of microscopic holes [per square inch] | Time (seconds) required to relieve 1 cubic centimeter air bubble for hole diameters | | |
| --- | --- | --- | --- |
|  | 10 μm | 32 μm | 100 μm |
| 1 |  |  | 2.6 |
| 10 |  | 3.6 | 0.26 |
| 100 |  | 0.36 |  |
| 1,000 | 3.2 |  |  |
| 10,000 | 0.32 |  |  |

As already noted, after the film is applied to the article surface and trapped air bubbles are avoided, gas evolution can still occur at the bond interface when the film is exposed to environment such as heat and light. Such gas is relieved by microscopic holes 27 and lifting and formation of bubbles are avoided. Since the rates at which such gas is evolved are very low, microscopic holes 27 can be very small (typically 1 to 10 micrometers) and installed with low areal density (1 to 1000 per square inch).

Referring further to FIG. 4, the adhesive film 10 may also include a layer 29 attached to surface 33 of substrate 21. Layer 29 can be a print ink, protective coating, or decorative coating. Alternately, layer 29 may be a composite layer comprising separate sublayers which may include print ink, protective coating, or decorative coating. Whichever the case, microscopic holes 27 penetrate through the layer of material 29 to provide air permeability for the film 10.

Microscopic holes 27 may be installed either before or after the adhesive 24 is applied to the substrate 21. Preferably, the holes are installed after providing the substrate 21 with the finish layer 29. When the holes are installed after coating the substrate with adhesive 24, some of the holes 27 may actually penetrate through the adhesive. Depending on the process for production of the holes 27 and the nature of the adhesive 24, holes 27 penetrating through adhesive 24 may become at least partially closed with passage of time. Holes that remain at least partially open increase the air permeability of the film 10. Adhesive film 10 may also include a release liner attached to surface 43 the adhesive 24. Furthermore, the substrate 21 of adhesive film 10 may be also embossed for decorative or other beneficial purposes.

Suitable techniques for installation of the holes 27 include mechanical piercing, electric discharge, and laser drilling. Mechanical piercing method and apparatus suitable for production of holes in the manufacture of the subject adhesive sheet is disclosed by Silverstein in the U.S. Pat. No. 3,789,710. Silverstein's method and apparatus use a heat assisted piercing and are particularly effective for use on substrates made of thermoplastic material. Mechanical piercing can produce holes down to about 0.020 inch diameter.

The use of electric discharge for perforation of dielectric sheet materials has been practiced commercially since the 1940's. Devices and methods for electric discharge perforation have been disclosed by Meaker in the U.S. Pat. No. 2,340,546; Menke in the U.S. Pat. No. 2,528,157; Bancroft et al. in the U.S. Pat. No. 3,385,951; Martin in the U.S. Pat. No. 4,029,938; and Whitman in the U.S. Pat. No. 4,447,709. Electric discharge can produce holes down to about 0.030 inch diameter.

Laser drilling has become a well established commercial practice since its initial introduction in the 1970's. General review of the state of the art in laser drilling is presented by Leo Rakowski in "Non-Traditional Methods for Making Small Holes," published in Modern Machine Shop, June 2002 issue, pages 76-83. Devices and methods for laser drilling have been disclosed by Lilly et al. in the U.S. Pat. No. 4,410,785; Kimbara et al., in the U.S. Pat. No. 4,568,815; Fukuchi in the U.S. Pat. No. 5,403,990; Steadman in the U.S. Pat. No. 6,344,256; and Hamada in the U.S. Pat. No. 6,720,524. Equipment for laser drilling of the holes suitable for use with the subject invention may also include means for detecting adhesive free portions of surface 33 and preferentially installing the hole (s) at such locations. Laser drilling is particularly suitable for production of precision-located holes smaller than 30 micrometers and as small as about 1 micrometer in diameter.

Referring now to FIG. 5, there is shown a side cross-sectional view of an adhesive film 10' in accordance with a variant of first embodiment of the subject invention. In this variant, the substrate 21 is coated with pressure sensitive adhesive on both faces: surface 32 is coated with adhesive 24 and surface 33 is coated with adhesive 24'. In each case, the adhesive coating is applied discontinuously so that portion 32a of surface 32 and portion 33a of surface 33 remain generally free of the adhesive. Preferably, the adhesive covers less than 90% of each the surface 32 and 33. The adhesive may be applied in regular, irregular, or entirely random patterns. Examples of suitable patterns are straight lines, stripes, wavy lines, curves, dots, shapes, checkered, crosshatched, and any combination thereof. If regular patterns are employed, preferably they should be coordinated and well aligned so that a high percentage of uncoated portions 32a and 33a lay directly opposite to each other. A pattern for microscopic holes 27 is preferably chosen so that a large percentage of the holes are at locations where they connect opposing uncoated portions 32a and 33a. Adhesives 24 and 24' can be both of the same type or different types. An example of two different types of adhesives that may be simultaneously used with adhesive film 10' are permanent pressure sensitive adhesive and a temporary pressure sensitive adhesive. Adhesive film 10' may also include a release liner attached to surface 42 the adhesive 24 and/or surface 43 of adhesive 24'.

Referring now to FIG. 6, there is shown a side cross-sectional view of an adhesive film 11 in accordance with a second embodiment of subject invention. This embodiment is similar to the first embodiment except that 1) pressure sensitive adhesive 124 is applied substantially continuously over the surface 32 of substrate 21, and 2) the pressure sensitive adhesive 124 is porous and permeable by air. Suitable porous pressure sensitive adhesive has been disclosed in prior art for example by Copeland in the U.S. Pat. No. 3,121,021. Holes 27 can be installed in any suitable pattern either before or after the adhesive 124 is applied to substrate 21. Since the adhesive 124 is porous, a large percentage of the holes 27 will connect to one or more pores in adhesive 124 leading up to surface 43. Air trapped between the adhesive film 11 and adherent article is then relieved by first passing through the adhesive 124 and then through holes 27 into the atmosphere.

Referring now to FIG. 7, there is shown a side cross-sectional view of an adhesive film 12 in accordance with a third embodiment of subject invention. This embodiment is similar to the first embodiment except that 1) the adhesive 224 is applied substantially continuously over the surface 32 of substrate 21, 2) the adhesive 224 can be either pressure sensitive or solvent activated, and 3) holes 27 penetrate through the adhesive 224.

Those skilled in the art can now appreciate from the foregoing description that the broad teachings of the subject invention can be implemented in a variety of forms. Therefore, while this invention has been described in connection with particular examples thereof, the true scope of the invention should not be limited since other modifications will become apparent to the skilled practitioner upon a study of the drawings and the following claims.

What is claimed is:

1. An adhesive film comprising a flexible substrate, a finish layer, and an adhesive coating, wherein
    a) Said flexible substrate has a first surface and a second surface;
    b) Said first and second surfaces are opposing each other and being generally parallel;
    c) Said adhesive coating being adhered to said first surface;
    d) Said finish layer being adhered to said second surface; and
    e) A plurality of microscopic holes are installed each extending at least through said substrate and through said finish layer.

2. Adhesive film of claim 1 wherein said microscopic holes are generally perpendicular to said first surface.

3. Adhesive film of claim 1 wherein transverse dimension of said microscopic holes is between about 1 to about 300 micrometers.

4. Adhesive film of claim 1 wherein said microscopic holes occur with density 1 to 10,000 per square inch.

5. Adhesive film of claim 1 with air permeability of 1 to 1000 Gurley seconds.

6. Adhesive film of claim 1 wherein said finish layer comprises a layer of print ink.

7. Adhesive film of claim 1 wherein said finish layer comprises a coating.

8. Adhesive film of claim 1 wherein said substrate is transparent.

9. Adhesive film of claim 1 wherein said adhesive is applied in a discontinuous manner leaving some portions of said first surface free of adhesive.

10. Adhesive film of claim 9 wherein at least some of said holes are applied in said portions of said substrate free of adhesive.

11. Adhesive film of claim 1 wherein thickness of said substrate is in the range from about 10 micrometers to about 1500 micrometers.

12. Adhesive film of claim 1 wherein said substrate is made of material selected from the family consisting of: paper, cardboard, plastic, metal, and aluminum foil.

13. An adhesive film comprising a flexible substrate, a pressure-sensitive adhesive coating, and a layer of material selected from the family of: printing ink, protective coating, and decorative coating; wherein
    a) Said flexible substrate has a first surface and a second surface;
    b) Said first and second surfaces are opposing each other and being generally parallel;
    c) Said pressure-sensitive adhesive coating being adhered to said first surface;
    d) A plurality of microscopic holes are installed extending at least through said substrate;
    e) Said layer of material being applied to said second surface of said substrate; and
    f) Said microscopic holes penetrate through said layer of material.

14. Adhesive film of claim 13 further including a releasable liner adhered to said adhesive coating.

15. Adhesive film of claim 13 wherein said adhesive coating is applied over less than 100 percent of the area of said first surface and, on the average, at least 1 said microscopic hole per square inch of said first surface penetrates said first surface in the area not covered by said adhesive coating.

16. Adhesive film of claim 13 wherein on the average, at least 1 said microscopic hole per square inch of said first surface penetrates through said adhesive coating.

17. Adhesive film of claim 13 wherein said adhesive coating is applied discontinuously in at least one pattern selected from the family comprising: a dot pattern, stripe pattern, wavy patterns, lines, squares, checkers, regular pattern, and irregular pattern.

18. The adhesive film of claim 17 wherein said holes are installed in a pattern coordinated with said pattern of said adhesive coating.

19. Adhesive film of claim 13 wherein said adhesive is substantially porous and permeable by air.

20. Adhesive film of claim 13 wherein said adhesive is applied to both surfaces of the substrate.

21. Adhesive film of claim 13 wherein said substrate is made of transparent material.

22. An adhesive film comprising a flexible substrate and a water soluble adhesive coating, wherein
    a) Said flexible substrate has a first surface and a second surface;
    b) Said first and second surfaces are opposing each other and being generally parallel;
    c) Said water soluble adhesive coating being adhered to said first surface; and
    d) A plurality of microscopic holes are installed each extending through said substrate.

23. The adhesive film of claim 22 further comprising a finish layer applied to said second surface and said holes penetrating through said finish layer.

24. The adhesive film of claim 23 wherein said finish layer comprises a print ink, protective coating, or decorative coating.

* * * * *